United States Patent
Geltser et al.

(10) Patent No.: US 10,524,985 B2
(45) Date of Patent: Jan. 7, 2020

(54) DISCRETE OBJECT SINGULATION

(71) Applicant: Capsa Solutions, LLC, Portland, OR (US)

(72) Inventors: Aleksandr R. Geltser, Stamford, CT (US); Vladimir Gershman, Stamford, CT (US)

(73) Assignee: Capsa Solutions, LLC, Portland, OR (US)

( * ) Notice: Subject to any disclaimer, the term of this patent is extended or adjusted under 35 U.S.C. 154(b) by 196 days.

(21) Appl. No.: 15/480,041

(22) Filed: Apr. 5, 2017

(65) Prior Publication Data

US 2018/0290818 A1    Oct. 11, 2018

(51) Int. Cl.
    *A61J 7/02*    (2006.01)
(52) U.S. Cl.
    CPC ........................................ *A61J 7/02* (2013.01)
(58) Field of Classification Search
    None
    See application file for complete search history.

(56) References Cited

U.S. PATENT DOCUMENTS

| | | | | |
|---|---|---|---|---|
| 6,256,967 B1* | 7/2001 | Hebron | ................... | B65B 57/20 53/131.3 |
| 8,827,112 B2* | 9/2014 | Yuyama | ................... | A61J 7/02 221/237 |
| 2005/0224510 A1* | 10/2005 | Remis | ..................... | B65B 5/103 221/69 |
| 2011/0301747 A1* | 12/2011 | Chambers | .......... | B65G 47/1428 700/231 |

* cited by examiner

*Primary Examiner* — Gene O Crawford
*Assistant Examiner* — Ayodeji T Ojofeitimi
(74) *Attorney, Agent, or Firm* — Gordon & Jacobson, P.C.

(57) ABSTRACT

A vibratory tablet feeder includes a reservoir for storing a supply of tablets with a pathway that leads to an exit opening for discharging tablets therefrom. Vibration of the reservoir moves tablets as a flow of tablets along the pathway to the exit opening. The feeder can include a wiper spaced vertically from the pathway. The wiper has a wiping surface that is configured to guide at least one vertically-bunched tablet in the flow of tablets away from the exit opening for return to the reservoir in order to provide singulated flow of tablets at the exit opening. A portion of the pathway may define a chamfered edge that is configured to guide at least one horizontally-bunched tablet in the flow of tablets away from the exit opening for return to the reservoir in order to provide singulated flow of tablets at the exit opening.

22 Claims, 14 Drawing Sheets

DISCRETE OBJECT SINGULATION

BACKGROUND

1. Field

The present application relates to an apparatus for singulating discrete objects, and, more particularly, for singulating pharmaceutical tablets.

2. State of the Art

Optical counters have been utilized in various applications to count objects. Such object counters may include a light source, an optical sensor, and an image processor. By way of example, an optical counter may include a light source placed opposite at least one optical sensor array to scan objects passing by the sensor array(s) to generate image data corresponding to the passing objects. Such data may be used by the image processor to generate a count of the objects passing by the sensor array(s).

Highly accurate counts of objects may be possible if the flow of objects is in a discrete series of single objects, i.e., "singulated flow." In a case where two object are together, a machine counter may be able to recognized each object, although there is a higher chance that the two objects will be miscounted than if the two objects were separated. Further, when three objects are together, it becomes almost impossible for a machine counter to use an image of the three connected objects to identify that there are three objects in the group. Thus, any failure of the mechanical feed system that results in flow that is not singulated, can cause a situation that leads to an inaccurate count. For example, if two or more objects are bunched together (a condition referred to as "bunching"), the count can be erroneous because the counter may count the bunched tablets as a single tablet. The bunching can occur where multiple tablets are stacked on top of one another (vertical bunching) or can occur where multiple tablets are stacked side-by-side one another (horizontal bunching).

SUMMARY

In accordance with an aspect of the present application, further details of which will be discussed in detail below, a vibratory tablet feeder is provided that includes a reservoir for storing a supply of tablets with a pathway that leads to an exit opening for discharging tablets therefrom. Vibration of the reservoir moves tablets as a flow of tablets along the pathway to the exit opening. The feeder includes a wiper spaced vertically from the pathway. The wiper may have a wiping surface that is configured to guide at least one vertically-bunched tablet (which is stacked on top of another tablet) in the flow of tablets away from the exit opening for return to the reservoir in order to provide singulated flow of tablets at the exit opening. A portion of the pathway may define a chamfered edge that is configured to guide at least one horizontally-bunched tablet (which is located horizontally next to another tablet) in the flow of tablets away from the exit opening for return to the reservoir in order to provide singulated flow of tablets at the exit opening. In this manner, the wiper and the chamfered edge may cooperate to mitigate the above-described unwanted bunching conditions.

The tablet feeder may include a feed bowl having a ramp defining the aforementioned pathway. The feed bowl may be vibrated in such a manner that a supply of tablets that are loaded into the feed bowl move by centrifugal force, gravity and friction to the ramp and then move by centripetal force, gravity and friction along the ramp to the exit opening. The wiper may extend from a sidewall of the feed bowl at a position adjacent to the exit opening. An inner edge of the ramp may define the chamfered edge.

The wiping surface of the wiper may extend substantially parallel to the ramp, and may be vertically spaced above the ramp. The wiping surface may curve radially inward with a leading end opposite a trailing end, where radial position of the trailing end is further away from the side wall of the feed bowl as compared to radial position of the leading end.

DETAILED DESCRIPTION

Referring to FIGS. 1A to 1E, an embodiment of a vibratory feeder 200 is shown, which may be used with a tablet counting system 100 (FIGS. 3A and 3B), further details of which are described below. The vibratory feeder 200 vibrates in such a manner that tablets loaded into the vibratory feeder 200 move by centrifugal force, gravity and friction to a guided pathway 202 and then move by centripetal force, gravity and friction along the guided pathway 202 in substantially singulated manner to an exit opening 204. As used herein the term "singulated flow" means a conveying process where tablets are separated for counting. Typically, the tablets move in single file, one after the other, in the singulated flow.

Figure 3A:
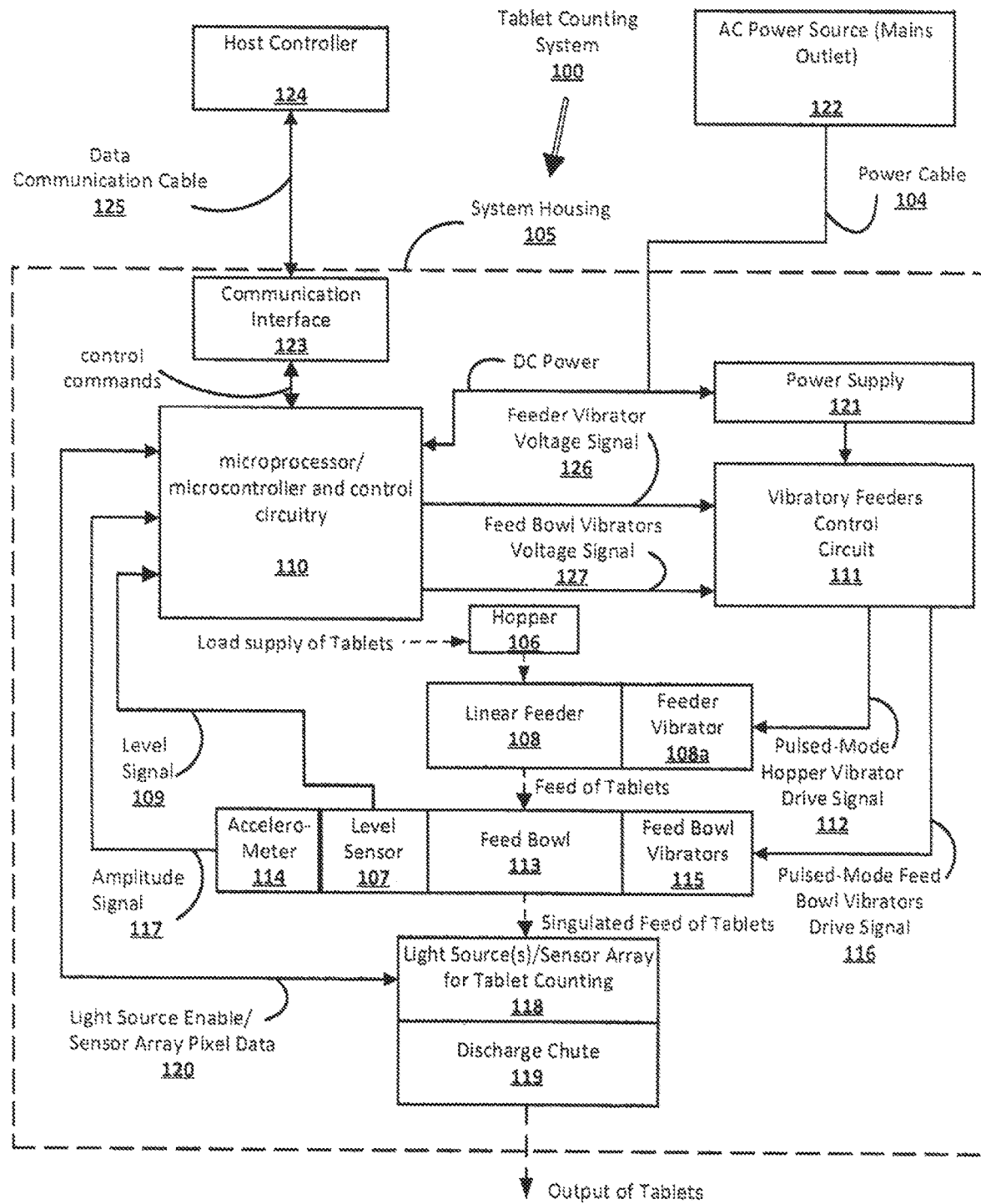
FIG. 3A is a schematic diagram of an embodiment of a tablet counting system.
Figure 3B:
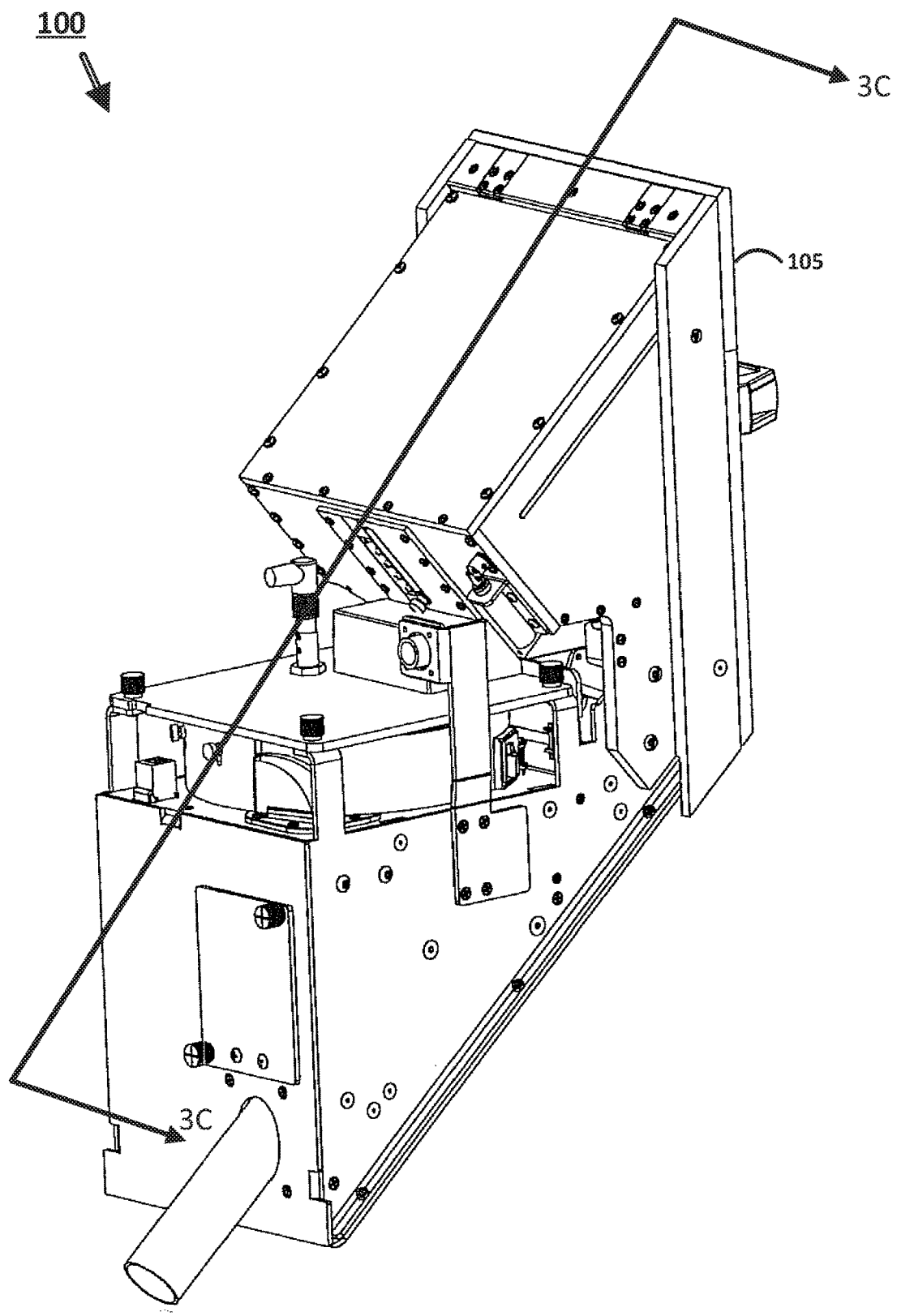
FIG. 3B is an isometric view of an embodiment of a tablet counting system.
Figure 3C:
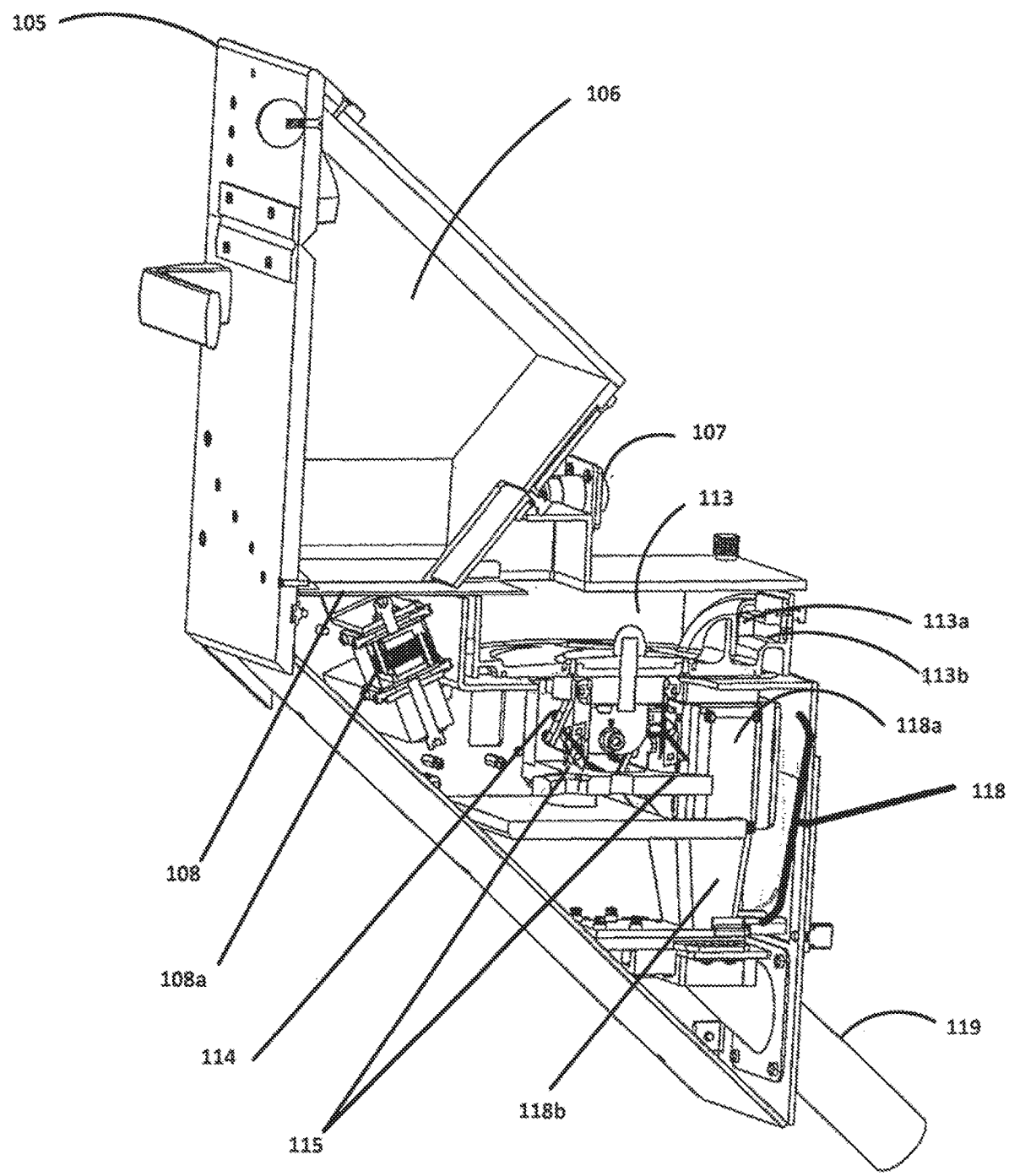
FIG. 3C is a view of the tablet counting system viewed along section 3C-3C of FIG. 3B.

The vibratory feeder 200 includes a feed bowl 201 that is vibrated by one or more electronically-controlled vibrators 115 (shown in FIGS. 3A and 3C). The center of the feed bowl 201 stores a supply of tablets that are loaded into the feed bowl 201 provided with a generally conical section 201a within which the pathway 202 is formed. In the embodiment shown in FIGS. 1A to 1D, the pathway 202 is partially defined by a ramp 202 that carries the singulated flow of tablets during operation of the vibratory feeder 200. The ramp 202 may be radially bounded by a peripheral wall 210 of the feed bowl 201 and a radially inward chamfered edge 208, as shown in FIGS. 1A, 1C, 1D, and 1E. The peripheral sidewall 210 extends about the outer circumference of the feed bowl 201. The ramp 202 extends along and adjacent to at least one arcuate section, such as section 214 (FIG. 1B), of the peripheral sidewall 210 of the feed bowl 201. In the particular embodiment of FIGS. 1A to 1E, the spiral ramp 202 winds counter-clockwise from the center of the bowl 200 upward and outward along ramp 202 (shown by broken line) toward an exit opening 204 near the upper periphery of the bowl 200. Also, the feed bowl 201 may have arcuate guide vanes 206 to guide the vibrating tablets radially outward.

As noted above, the ramp 202 extends along an arcuate section 214 of the feed bowl 201 leading into and adjacent to the exit opening 204. The portion of the ramp 202 along the arcuate section 214 is substantially horizontal along its length and radial direction to facilitate moving tablets toward the exit opening 204. The radially inner chamfered edge 208 along the arcuate section 214 is also arcuate and is angled downwardly by an angle of 30 to 60 degrees with respect to the horizontal direction. The dimensions of the ramp 202 and the angle of the chamfered edge 208 relative to horizontal may be based on the tablet size to be counted. For example, the width of the ramp 202 may be 65% to 75% of the minimum tablet size (e.g., tablet diameter) to be counted. For a given ramp width, the minimum width (e.g., diameter) of smaller size tablets is 65% to 75% of the width of the ramp.

In the embodiment shown in FIGS. 1A to 1E, a curved wiper assembly 216 is coupled to the side wall 210 above the ramp 202 along the arcuate section 214. As shown in FIGS. 1A to 1F, the wiper assembly 216 includes a curved horizontal segment 216a and a curved vertical segment 216e.

Figure 1A:
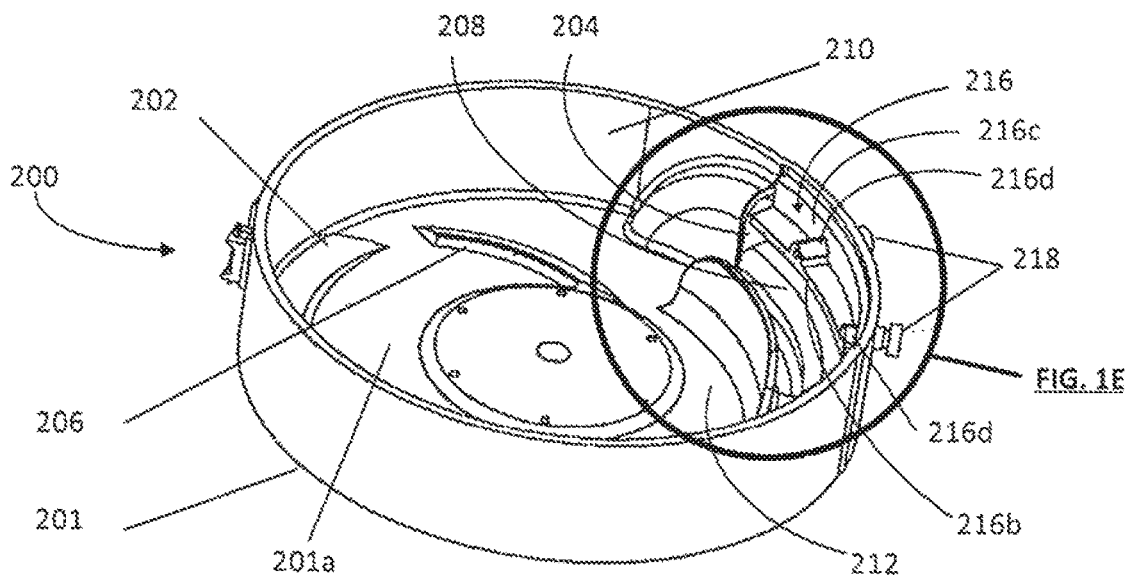
FIG. 1A is an isometric view of an embodiment of a feed bowl used in a tablet counting system.
Figure 1B:
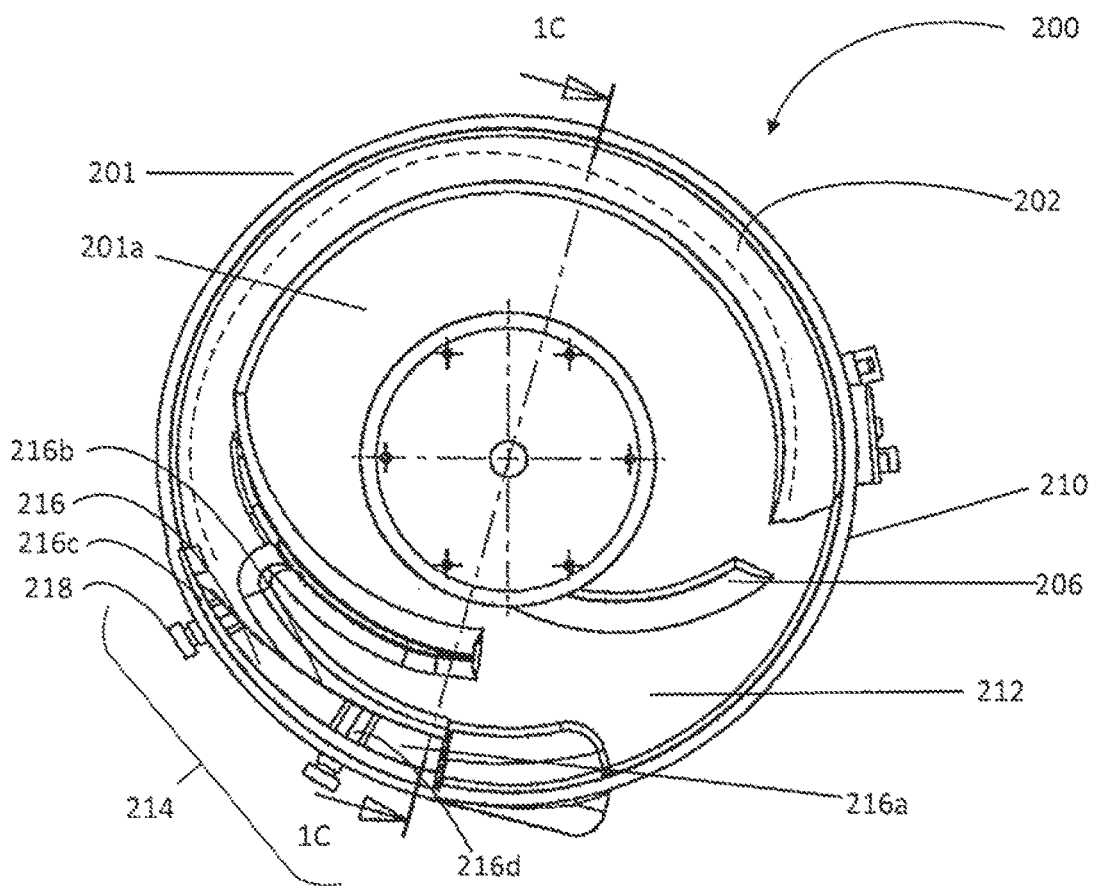
FIG. 1B is a plan view of the feed bowl of FIG. 1A.
Figure 1C:
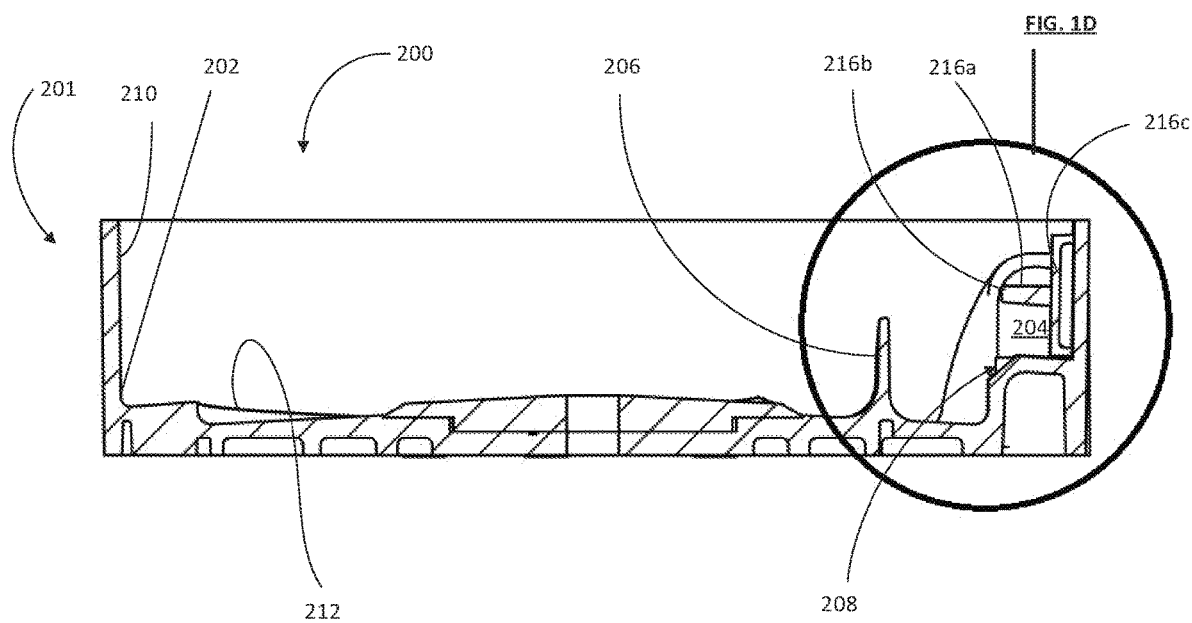
FIG. 1C is a view of the feed bowl of FIG. 1A viewed along section 1C-1C in FIG. 1B.
Figure 1D:
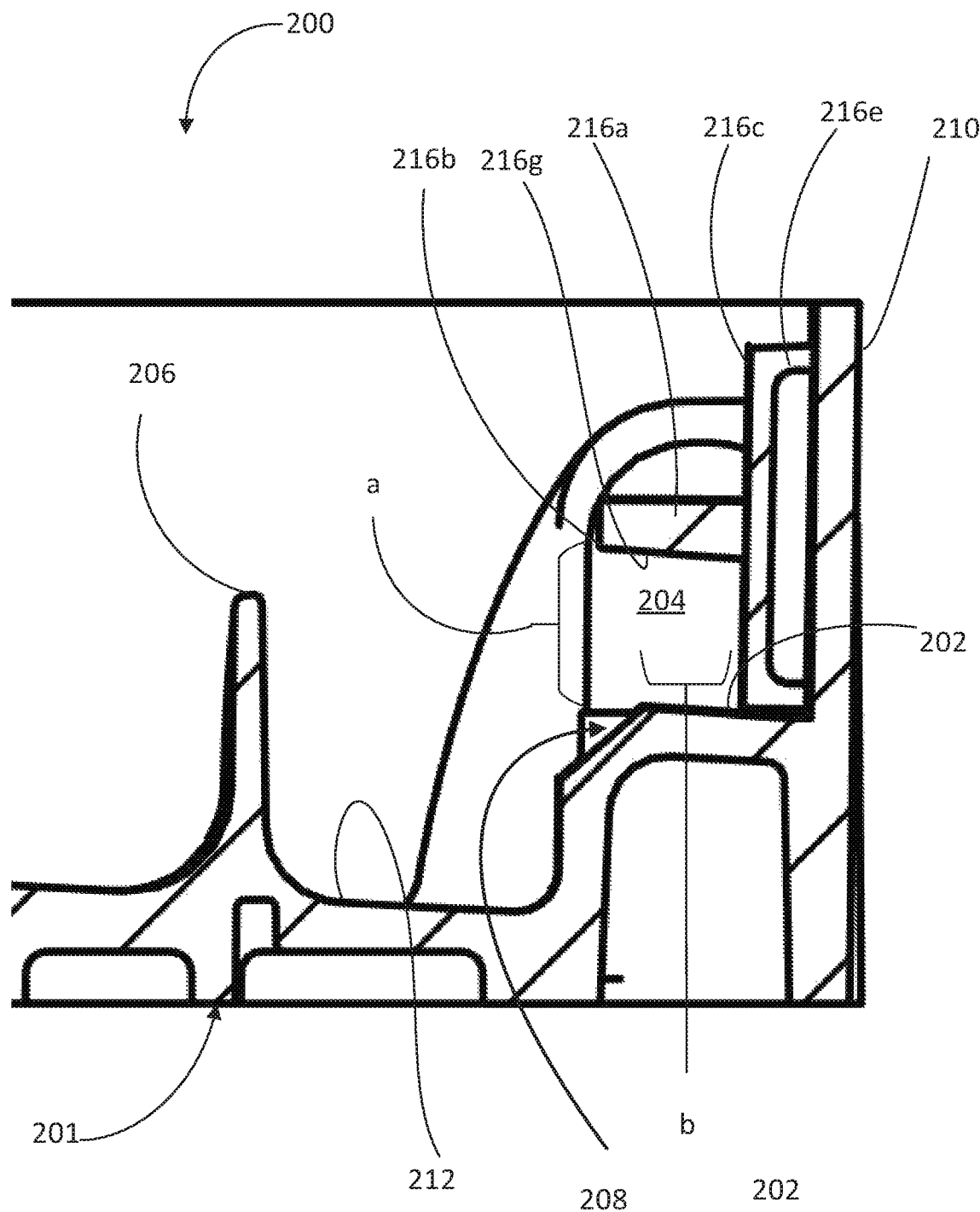
FIG. 1D is an exploded section view of the circled portion in FIG. 1C.
Figure 1E:
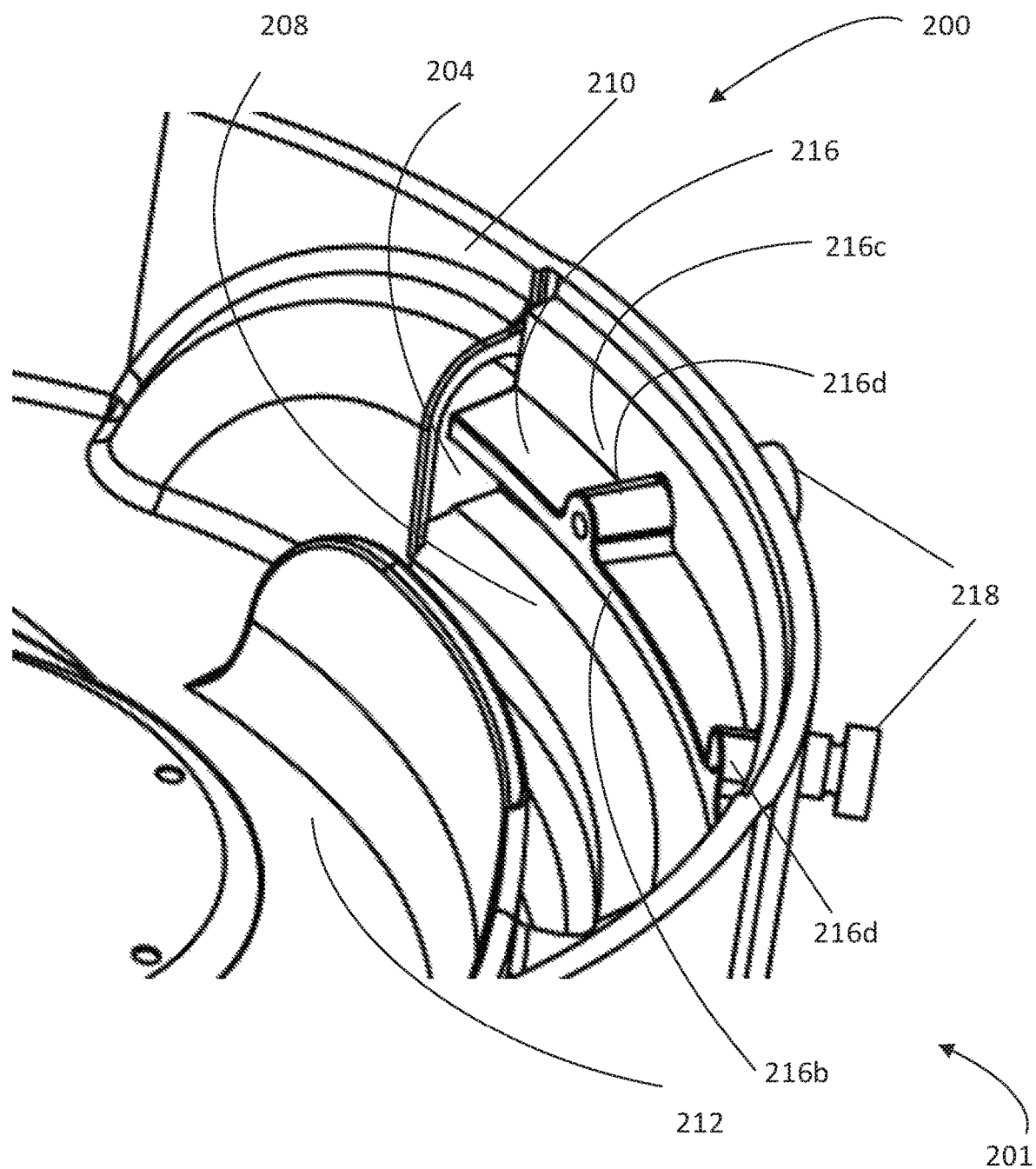
FIG. 1E is an exploded view of a portion of the feed bowl shown in FIG. 1A.
Figure 1F:
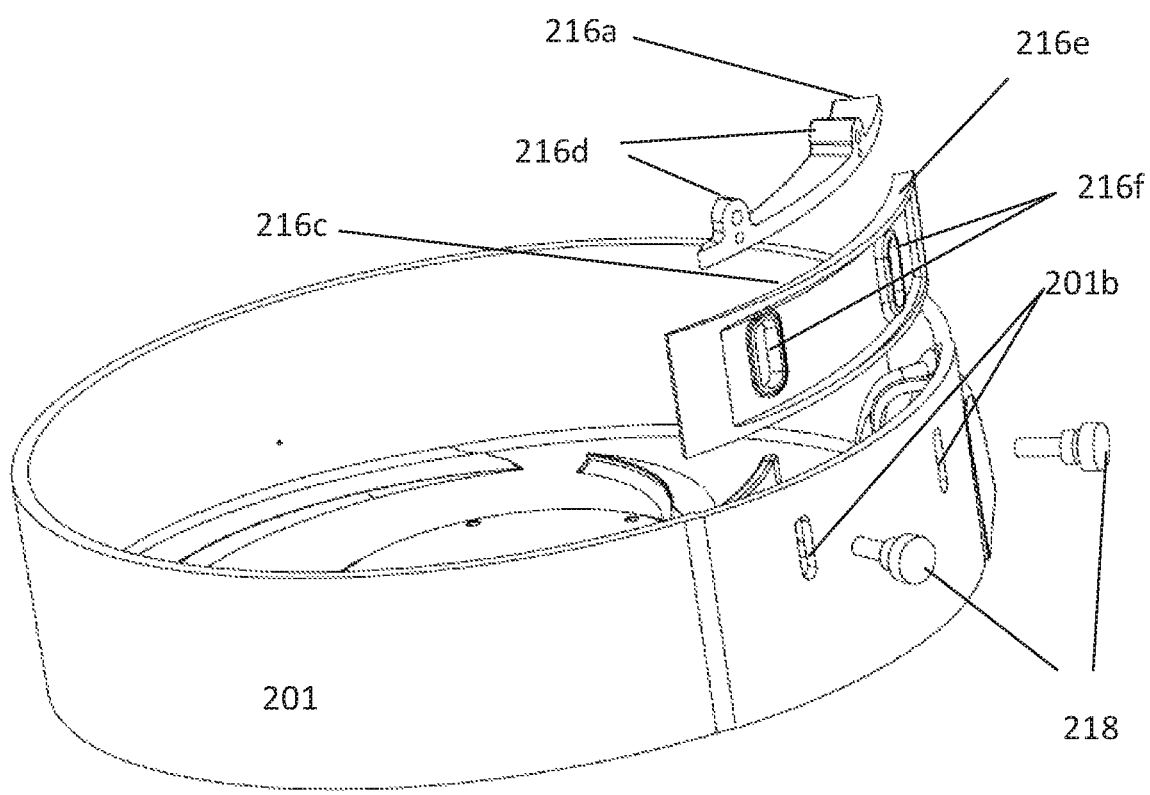
FIG. 1F is an assembly drawing of the embodiment of the feeder shown in FIGS. 1A and 1B.

As shown most clearly in FIG. 1F, the vertical segment 216e defines vertical slots 216f that are configured to align with threaded flanges 216d of the horizontal segment 216a. The sidewall 210 of the bowl 201 defines vertical slots 201b that are configured to align with the vertical slots 216f of the vertical segment 216e and with the flanges 216d of the horizontal segment 216a. The threaded flanges 216d are configured to receive male threaded fasteners 218 (e.g., thumbscrews), which are configured to extend through the vertical slots 201b of the bowl 201 as well as through the vertical slots 216f of the vertical segment 216e. In this manner, the vertical slots, threaded flanges and fasteners allow vertical adjustment of the wiper assembly 216 and, thus, a distance "a" (FIG. 1D) between a lower surface 216g and the ramp 202 along the arcuate section 214. For example, the wiper assembly 216 may be adjusted vertically to adjust the distance "a" in FIG. 1D by loosening the fasteners 218, moving the horizontal segment 216a of the wiper assembly 216 into a desired vertical position, and tightening the fasteners 218 to secure the wiper assembly 216 to the bowl 201 at the desired position.

In the embodiment shown in FIGS. 1A to 1E, the bottom portion of the vertical segment 216e extends vertically downward toward the ramp 202 and intrudes into the space above the ramp 202 in the feed path of tablets along the ramp 202 in the arcuate section 214. In one configuration, the bottom portion of the vertical segment 216e can extends vertically downward such that it interfaces to or is near the ramp 202, although this is only exemplary. In other configurations, the bottom portion of the vertical segment 216e need not extend all the way to the ramp 202. As shown most clearly in FIG. 1F, the vertical segment 216e (including the bottom portion of the vertical segment 216) has a varying thickness (in the radial direction) along arcuate section 214, being thickest nearer the exit opening 204. The varying thickness of the bottom portion of the vertical segment 216e provides variable spacing (e.g., width "b" in FIG. 1D) between surface 216c of the vertical segment 216e relative to the chamfered edge 208 of the ramp 202, which is useful for singulating the flow of tablets that have a size (diameter) that is 65 to 75% of the width "b", as discussed in greater detail below.

The curved horizontal segment 216a extends from the curved vertical segment 216e in a direction substantially parallel to the ramp 202 along the arcuate section 214 (FIG. 1B). The curved horizontal segment 216a is tapered in its radial dimension (i.e., width) such that the width of the horizontal segment 216a that is farther from the opening 204 (first end of the horizontal segment 216a) is less than the width of the horizontal segment 216a that is closer to the opening 204 (second end of the horizontal segment 216a). Furthermore, as best shown in FIG. 1B, the width of the horizontal segment 216a at its second end is at least equal to the width of the ramp 202 below the wiper assembly 216. In this configuration, the tapered design of the horizontal segment 216a defines a curved wiper surface 216b that is spaced vertically from the ramp 202. Furthermore, the vertical projection of the curved wiper surface 216b can intersect the ramp 202 as shown, for example, in FIG. 1B. In an alternative embodiment (not shown), the wiper surface 216b can be formed as a curved wireform which may extend from the curved vertical segment 216e or from the inner side wall 210 of the bowl 201 and may be bent in the shape of the radially inner edge 216b as shown. As will be discussed below, the wiper surface 216b acts to control vertical bunching of tablets by guiding the upper or top tablet of a respective vertically-bunched tablet pair radially inward such that the upper tablet of the vertically-bunched tablet pair falls down the chamfered edge 208 for return to the supply of tablets located in the center of the bowl 201.

In one embodiment, the distance "a" as shown in FIG. 1D is configured such that it is in the range of 1.1 to 1.8 times the height of the tablets loaded in the feed bowl 201. This spacing will ensure that the wiper surface 216b will not contact or interfere with the flow of singulated tablets moving along the ramp 202. Because different types of tablets have different sizes (e.g., vertical height and diameters), various wipers with differing dimensions may be used (interchanged) with the bowl 200 to adjust the vertical offset "a" of the wiper surface 216b relative to the ramp 202 of the feed bowl based on the type and size of the tablets loaded into the feed bowl 201 for feeding.

Also, as will be discussed below, the bottom portion of the vertical plate 216e below the horizontal wiper segment 216a acts to control horizontal bunching of tables by guiding a respective horizontally-bunched tablet pair inward such that the inner tablet of the horizontally-bunched tablet pair falls down the chamfered edge 208 for return to the supply of tablets located in the center of the bowl 201. The dimensions and, specifically, the thickness (radial dimension) of the vertical plate 216e (including the thickness of the bottom portion of the vertical plate 216e) can be based on the dimensions of the tablets loaded into the feed bowl 201 for feeding and the width of the ramp 202 of the bowl 201. Because different types of tablets have different horizontal dimensions (e.g. tablet diameter), various wipers with differing vertical plate 216e dimensions may be used (interchanged) with the bowl 201 to adjust the spacing of the vertical plate 216e wiper surface 216c relative to the chamfered edge 208 based on the type and size of the tablets loaded into the feed bowl 201 for feeding, further details of which are described below.

When the vibrators 115 (FIG. 3C) are vibrating at a certain amplitude, tablets that are in the feed bowl 200 may move in response to the vibration along the ramp 202 as shown by the broken line. However, as the tablets move, there is a possibility that multiple tablets may stack one on top of the other and move together along the ramp 202, a condition hereinafter referred to as "vertical bunching". Also, there is a possibility that multiple tablets may move horizontally together up the ramp 202 towards the output opening 204, a condition hereinafter referred to as "horizontal bunching". If such horizontal and/or vertical bunching conditions occur, and multiple tablets arrive at the output opening 204 together, the sensor array 118 may generate image data that corresponds to a single tablet, rather than multiple tablets, thereby introducing an error into the tablet count.

To mitigate the vertical bunching condition, the wiper assembly 216 is configured to remove or "wipe off" all tablet(s) that may be travelling on top of a bottom tablet that is in contact with and moving along the ramp 202 to the exit opening 204. For example, a condition may occur where an upper tablet is stacked on top of a lower tablet and both tablets move along the ramp 202 in such a stacked configuration in the direction of the arrows in FIG. 1B. When the stacked tablets arrive on the ramp 202 along the arcuate section 214, the curved wiper surface 216b contacts the upper tablet. As the two tablets continue to move further toward the exit opening 204 and the second end of the wiper 216, the radial dimension (i.e., width) of the horizontal segment 216a increases and the wiper surface 216b displaces the upper tablet further and further radially inwardly relative to the lower tablet until the upper tablet falls down the chamfered edge 208 for return to the supply of tablets located in the center of the bowl 201.

Also, to mitigate the horizontal bunching condition, the ramp 202 along the arcuate section 214 is configured to cause all but a single tablet to fall to the bottom surface 212 before the single tablet arrives at the exit opening 204 of the feed bowl 200. As shown in FIGS. 1C and 1D, the bottom portion of the curved vertical segment 216c extends downward toward the ramp 202 to intrude into the flow of tablets moving along the ramp 202 and reduces the effective width of the ramp 202 to the variable dimension "b" used for guiding tablets. This configuration acts to guide a respective horizontally-bunched tablet pair inward such that the inner tablet of the horizontally-bunched tablet pair falls down the chamfered edge 208 for return to the supply of tablets located in the center of the bowl 201. In one embodiment, the horizontal distance "b" between the curved vertical segment 216c and the chamfered edge 208 at section 1C-1C (which may be considered an effective width of the ramp 202 at that location on the ramp 202) is 65% to 75% of the diameter of the tablets being counted. This width ensures that if two tablets are moving side by side, the radially inward tablet will have its center of mass projected onto the chamfered edge 208 rather than the ramp 202, causing such radially inner tablet to slide down the chamfered edge 208. Thus, owing to the curved vertical segment 216c effectively reducing the width of the ramp 202 along the arcuate section 214 towards the exit opening 204, as a plurality of horizontally bunched tablets move along the ramp 202 in the arcuate section 214, a single tablet will separate from the plurality and move up the ramp 202 while the other tablets of the plurality will move along the chamfered edge 208 until the vibration of the feed bowl 200 causes those other tablets to slide down the chamfered edge to the bottom surface 212. Thus, the wiper assembly 216 and the chamfered edge 208 may cooperate to mitigate the above-described unwanted horizontal and vertical bunching conditions.

FIGS. 2A to 2F show another embodiment of a vibratory feeder 300 that includes the bowl 201 of the feeder 200, and a wiper 316 that differs from the wiper assembly 216 to accommodate tablets of a larger horizontal width (e.g., diameter) than the tablets counted using the wiper assembly 216 with the bowl 201. Specifically, the wiper is used for vibratory feeding of tablets that have a width or diameter that is greater than 50% of the width of the ramp 202 (more preferably for tablets that have a width or diameter width that is 65% to 75% of the width "b" (FIG. 2G) of the ramp 202. In FIGS. 2A to 2G, elements that are the same as for the feeder 200 are numbered the same.

The wiper assembly 316 has a curved horizontal segment 316a and a curved vertical segment 316e that are formed together as a unitary assembly, although in other embodiments the vertical segment 316e and horizontal segment 316a may be separate pieces that are selectively assembled together like horizontal segment 216a and the vertical segment 216e of the wiper assembly 216 described above. The curved vertical segment 316e defines holes 316f that are configured to align with the vertical slots 201b defined in the bowl 201. The holes 316f are threaded to engage threads of fasteners 218 (e.g., thumbscrews) to couple the wiper 316 to the bowl 201, as shown in FIGS. 2A and 2C to 2F. The vertical slots 201b in the bowl 201 allow for vertical adjustment of the wiper 316 relative to the ramp 202 of the bowl 201. For example, the wiper assembly 316 may be adjusted vertically to adjust a dimension "a" in FIG. 2G by loosening the fasteners 218, moving the wiper assembly 316 into a desired vertical position, and tightening the fasteners 218 to secure the wiper 316 to the bowl 201 at the desired position.

Figure 2A:
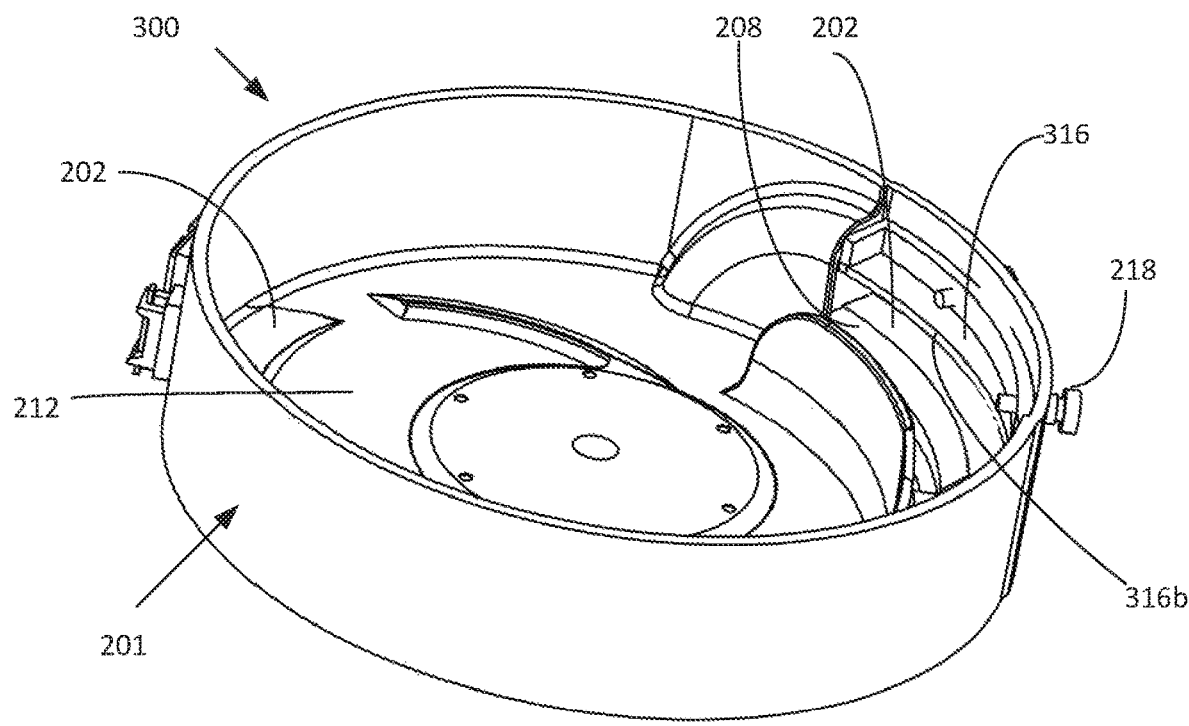
FIG. 2A is an isometric view of another embodiment of a feed bowl used in a tablet counting system.
Figure 2B:
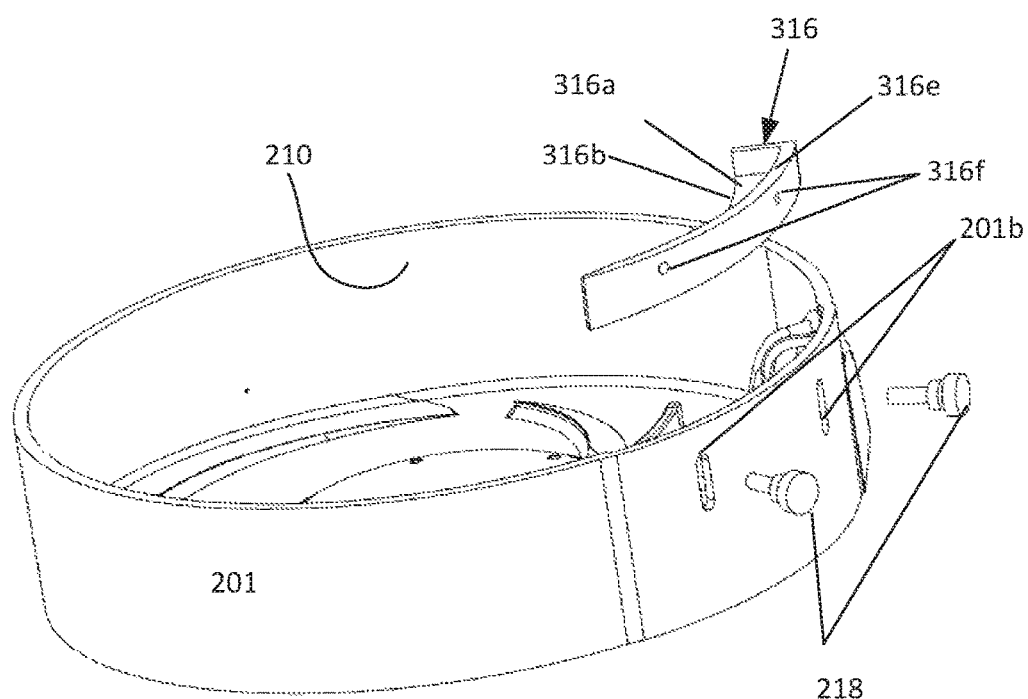
FIG. 2B is an assembly drawing of the embodiment of the feeder shown in FIG. 2A.
Figure 2C:
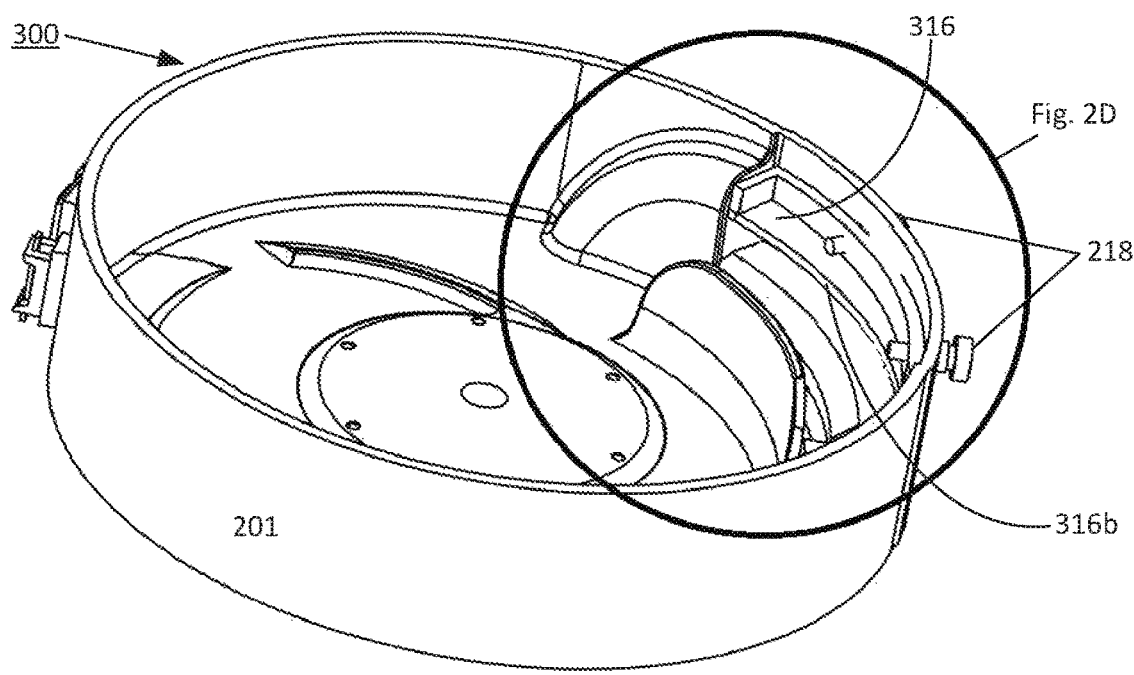
FIG. 2C is another isometric view of the feed bowl of FIG. 2A identifying an exploded area in FIG. 2D.
Figure 2D:
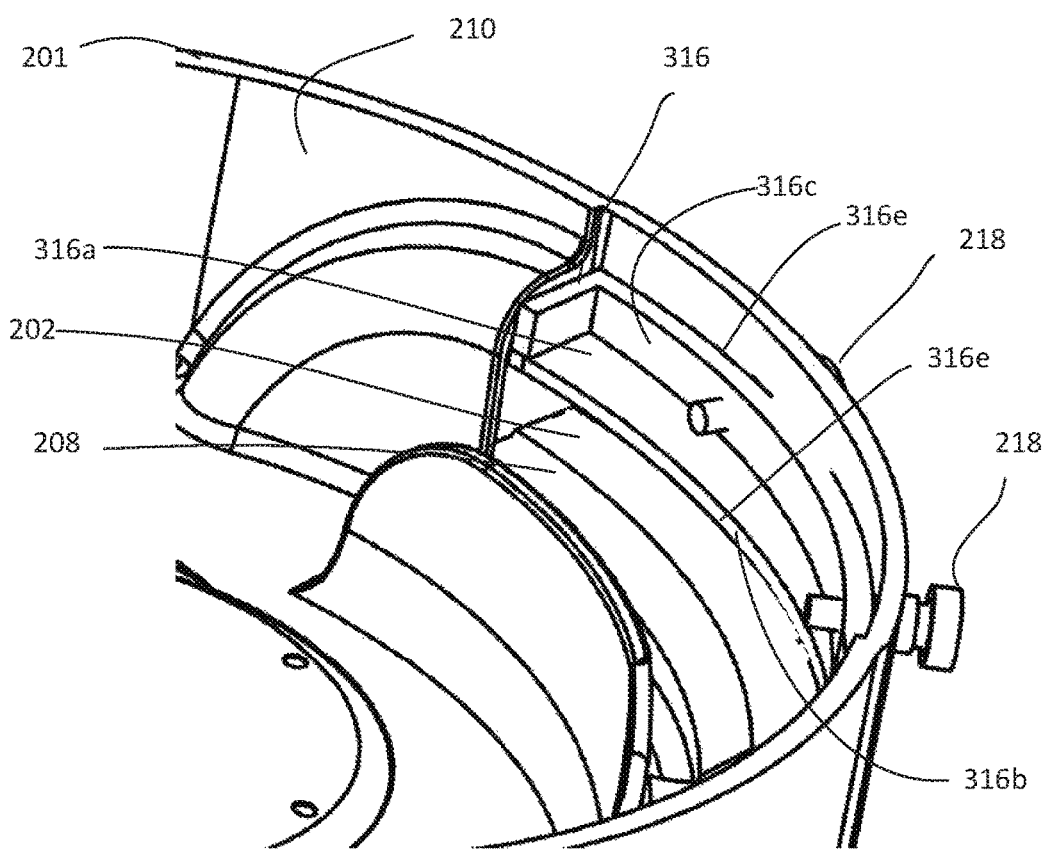
FIG. 2D is an exploded isometric view of the circled portion in FIG. 2C.
Figure 2E:
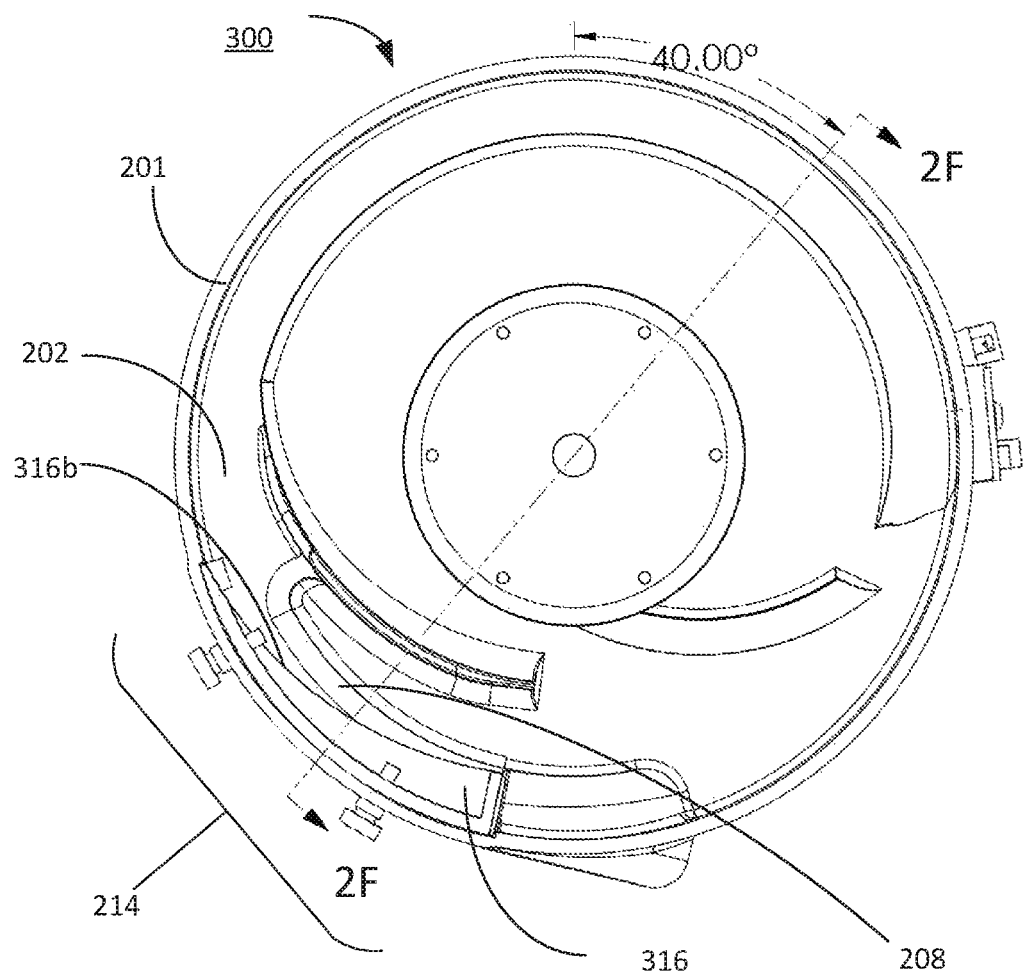
FIG. 2E is a plan view of the feed bowl of FIG. 2A.
Figure 2F:
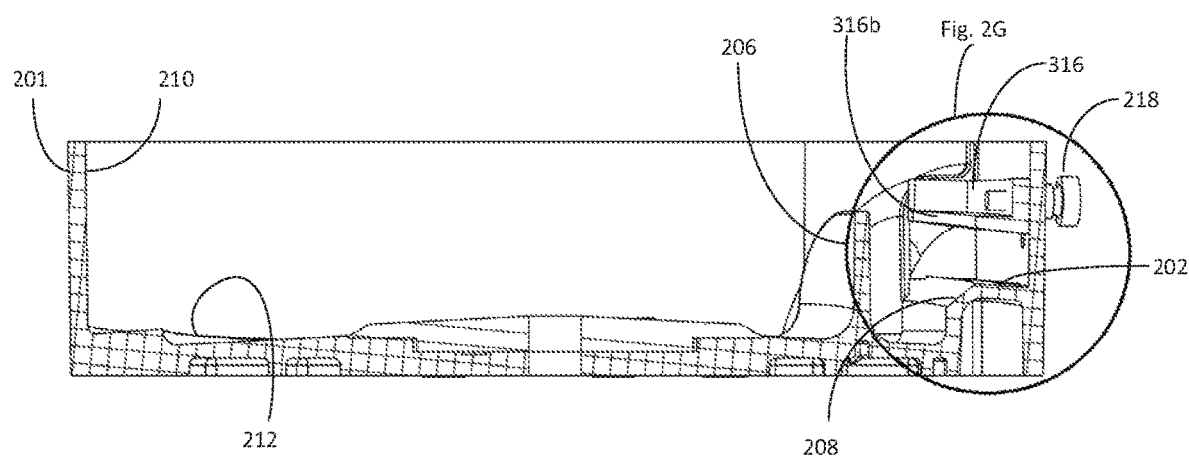
FIG. 2F is a view of the feed bowl of FIG. 2A viewed along section 2F-2F in FIG. 2E.
Figure 2G:
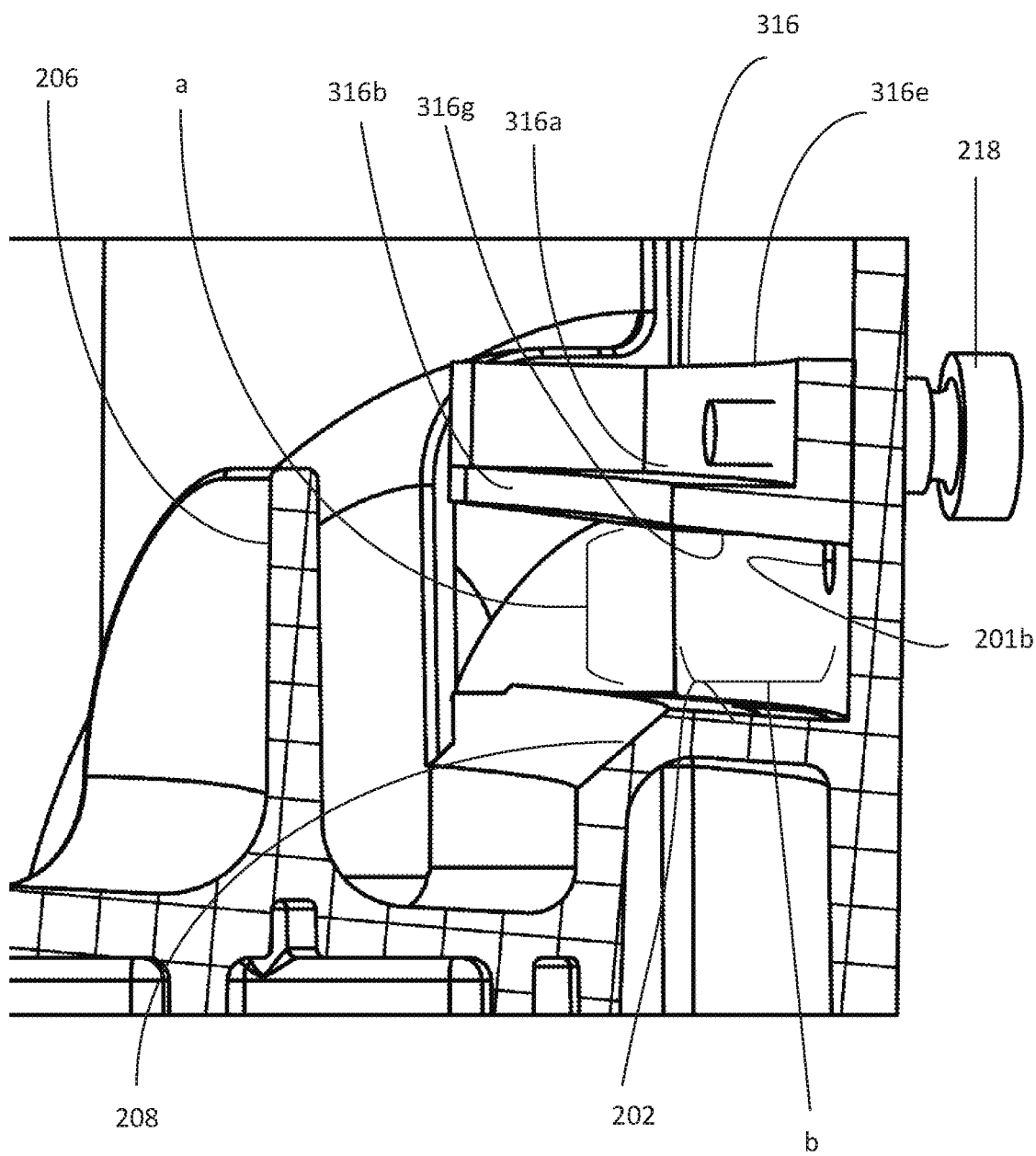
FIG. 2G is an exploded view of a portion of the feed bowl shown in FIG. 2F.

The wiper assembly 316 differs from wiper assembly 216 in that the curved vertical segment 316e does not extend below the horizontal segment 316a towards the ramp 202. Thus, the vertical segment 316e does not intrude into or otherwise reduce the width "b" (FIG. 2G) of the ramp 202 along arcuate section 214 (FIG. 2B). In this regard, the vertical segment 316e may be used when the feeder 300 is used to sort larger tablets than would be sorted using the wiper assembly 216. The larger tablets may have a width or diameter that is 65 to 75% of the width "b" (FIG. 2G) of the ramp 202 so that two tablets side-by-side could not exist on the ramp 202 without one of the tablets sliding down the chamfered edge 208. For example, in a case where two tablets are arranged horizontally approaching the ramp 202 along arcuate section 214, a radially inner tablet would have its center of mass projecting onto the chamfered edge 208 rather than the ramp 202, such that it would slide down the chamfered edge 208, leaving the radially outward tablet on the ramp 202. In such a case, there is no need to have the vertical plate 316e intrude into the width of the ramp 202, because the width of the tablets themselves and the width of the ramp 202 and the chamfered edge 208 can eliminate any horizontal bunching of tablets.

The curved horizontal segment 316a defines a wiper surface 316b that functions in the same way as the wiper surface 216b, i.e., to break up vertically-bunched tablets as described above.

Figure 2H:
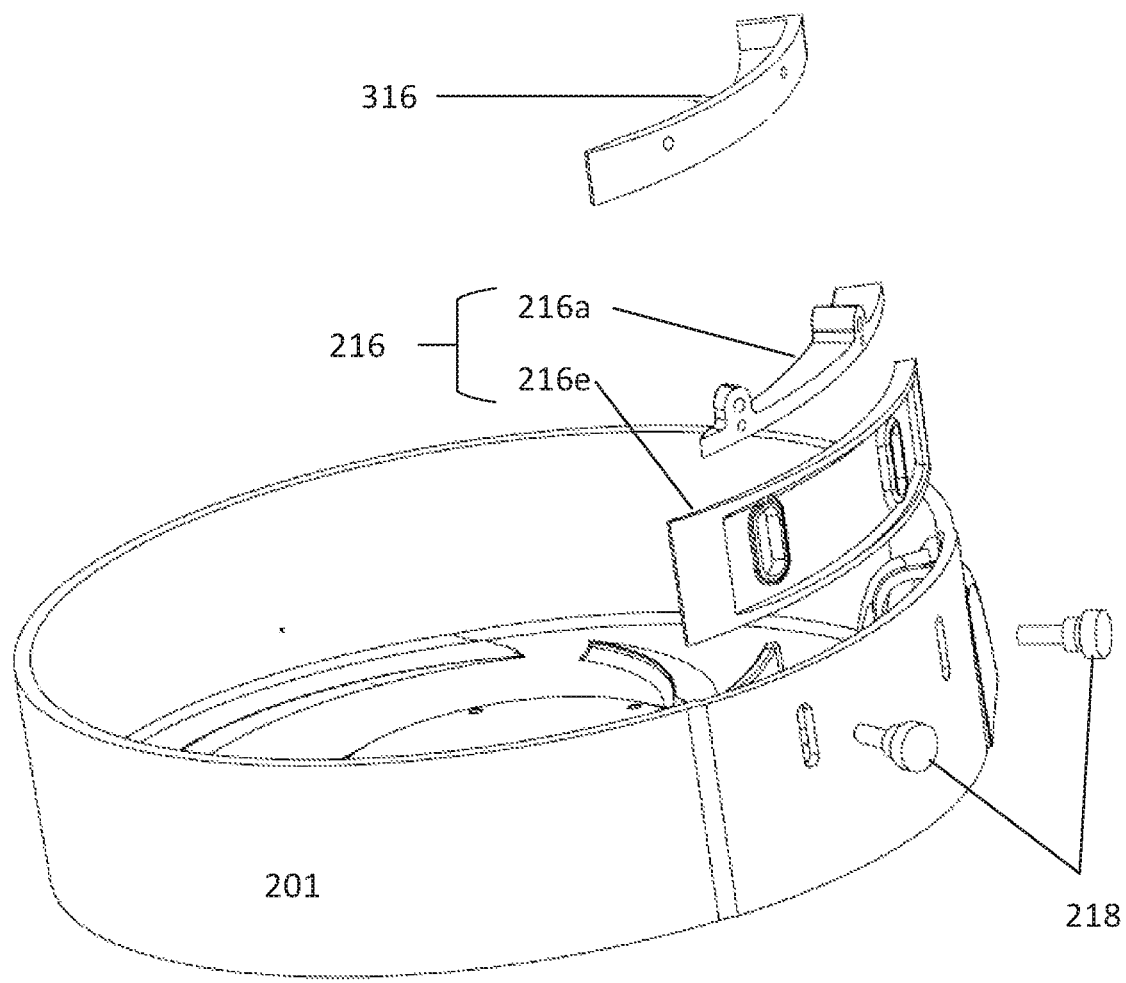
FIG. 2H shows an assembly view of a feeder kit in accordance with an aspect of the disclosure.

FIG. 2H shows a kit comprised of a bowl 201, a plurality of interchangeable wipers (wiper 216 and wiper 316), and fasteners 218 for selectively coupling either of the wiper assembly 216 or wiper assembly 316 to the bowl 201. As described above, the wiper assembly 216 or the wiper assembly 316 may be selectively coupled to the bowl 201 using the fasteners 218. The wiper assemblies 216 and 316 may be interchanged based on the size of tablets to be counted. Wiper assembly 216 may be used for a first range of tablet sizes and wiper assembly 316 may be used for second range of tablet sizes that is different from the first range. Thus, the respective wiper assemblies 216 and 316 are sized in relation to the reservoir based on a corresponding size or range of sizes of tablets. As noted above, when the wiper assembly 216 or 316 is coupled respectively to the reservoir, the wiper assembly is spaced vertically from the ramp 201 of the bowl 201, and the wiper assembly has a wiping surface that is configured to guide at least one bunched (vertically and or horizontally bunched) tablet in the flow of tablets away from the exit opening 204 for return to the bowl 201 in order to provide singulated flow of tablets at the exit opening 204.

Referring to FIGS. 3A to 3C, a vibratory tablet counting apparatus 100 is configured to count tablets (not shown) that are loaded into a feed hopper 106 of the system 100 as the tablets are being dispensed, i.e., into a container (not shown). Further details of the operation of the vibratory tablet counting apparatus 100 are described below.

As shown in further detail in the section view of FIG. 3C, the feed hopper 106 is supported within a housing 105. The hopper 106 is configured to store a supply of tablets. An electrically-controlled feeder vibrator 108a and linear feeder 108 are coupled to the hopper 106 and are mounted within the housing 105. The linear feeder 108 operates to convey tablets stored in the hopper 106 to a feed bowl 113 mounted within the housing 105. A level sensor 107 can be mounted within the housing 105 and configured to sense the level of the tablets contained in the feed bowl 113. The level sensor 107 can transmit a level signal 109 to processor/control circuitry 110 for control of the linear feeder 108, which will be described in greater detail below.

The feed bowl 113 is mounted within the housing 105 on a frame including one or more electronically-controlled feed bowl vibrators 115. The feed bowl 113 stores tablets conveyed from the hopper 106. The peripheral region of the interior of the feed bowl 113 has a spiral guide pathway or ramp 113b that leads to an exit opening 113a. The feed bowl vibrator(s) 115 operate to vibrate the feed bowl 113 in a manner that causes a plurality of tablets stored in the feed bowl 113 to move by centrifugal force, gravity and friction to the spiral guide pathway 113b and then move by centripetal force, gravity and friction along the spiral guide pathway 113b to the exit opening 113a. An accelerometer 114 can be mounted within the housing 105 and configured to measure acceleration of the feed bowl 113. The accelerometer 114 can transmit a signal 114 to the processor/control circuitry 110, which can process the signal 114 to measure vibration amplitude of the feed bowl 113 for control of the feed bowl vibrator(s) 115, as will be described in greater detail below.

The singulated flow of tablets that pass through the exiting opening 113a is supplied to an optical system supported within the housing 105. The optical system 118a includes at least one light source and at least one detector or optical sensor array, located about a lower channel 118b disposed downstream from the exit opening 113a of the feed bowl 113. The optical system 118a is configured to count the singulated flow of tablets that pass through the channel 118 as well as determine a size classification for the singulated flow of tablets that pass through the channel 118. The singulated flow of tablets exits from the channel for output to a discharge chute 119 supported by the housing 105. The discharge chute 119 is configured to guide the counted tablets from the apparatus 100 to a temporary storage chamber (not shown) or a container (not shown), such as a tablet bottle. Therefore, the flow of tablets is from the hopper 106, to the feed bowl 113, through the channel of the optical system, and to the discharge chute 119 for dispensing to a container.

In embodiments, the light source of the optical system can include one or more illumination sources that emit radiation (such as infrared light) such that it crosses the inner area of optical system 118a and is blocked in part by subject tablets as they pass through the channel 118. A portion of the unblocked radiation is directed by a focusing mechanism (such as lens) for reception by a corresponding detector or optical sensor array (such as a linear or area CCD or CMOS image sensor(s)), which function as an image acquisition component. The detector or optical sensor array repetitively detects (scans) the received radiation at a predetermined, substantially constant rate and generates image pixel data that is converted into the digital domain and processed by the processor/control circuitry 110 to generate a count of the singulated flow of tablets that pass through the channel 118 as well as determine a size classification for the singulated flow of tablets that pass through the channel 118. The processor/control circuitry 110 can transmit an enable/disable signal to activate/deactivate certain components of the optical system (such the light source and/or detector array circuitry) as needed.

In embodiments, the image pixel data can be processed by the processor/control circuitry 110 to provide a count of discretely identifiable tablets in several consecutive scan lines or in one or more image frames. Furthermore, the image pixel data can be processed by the processor/control circuitry 110 to approximate the areal coverage or "blob size" of the tablets being counted in several consecutive scan lines or one or more image frames, and determine a size classification that matches such areal coverage. Furthermore, where the approximated areal coverage is too small to be consistent with any anticipated tablet, the tablet may be tagged as possibly chipped or a fragment. Similarly, where the approximated areal coverage shows a shape that is non-uniform, exceeds a stipulated range of curvature, or otherwise exceeds predefined geometric limits, the tablet may be tagged as possibly defective.

As shown in FIG. 3A, the apparatus 100 can also include a power supply 121 that is electrically connected to and is powered by an external power source 122, which may be an alternating current (AC) power source (mains outlet). The power supply 121 is also electrically connected to and powers the processor/control circuitry 110 and the vibratory feeders control circuit 111, which powers the feeder vibrator 108a and the feed bowl vibrators 115. The power supply 121 may be an AC to DC current switching power supply to supply DC power to the processor/control circuitry 110 and/or the vibratory feeders control circuit 111.

As noted above, the processor/control circuitry 110 can be configured to receive a level signal 109 from the level sensor 107 for control of the feeder vibrator 108a. Specifically, the processor/control circuitry 110 outputs a feeder vibrator voltage signal 126 for supply to the vibratory feeder control circuit 111, which is configured to transmit a pulsed-mode hopper vibrator drive signal 112 to the feeder vibrator 108a based upon a hopper vibrator voltage signal 126. When the level signal 109 show indicates that the tablet level in the feed bowl 113 is below a low limit, the processor/control circuitry 110 sends a feeder vibrator signal to the feeder control unit 111, which then transmits a drive signal 112 to the feeder vibrator 108a to drive the feeder vibrator 108a so that the linear feeder 108 conveys tablets to the feed bowl 113 to increase the level of tablets in the feed bowl 113. When a level of tablets in the feed bowl 113 reaches a predetermined amount, the level sensor 108 transmits the level signal 109 to the processor/control circuitry 110, which then, updates the feeder vibrator signal to the feeder control unit 111, which transmits an updated drive signal 112 to the feeder vibrator 108a to stop vibration of the feeder vibrator 108a. This aforementioned feedback arrangement can be performed repetitively during operation of the apparatus 100 so that an adequate supply of tablets is present in the feed bowl 113 to be counted.

Furthermore, as noted above, the processor/control circuitry 110 can be configured to receive a signal 117 from the accelerometer 114 for control of the feed bowl vibrator(s) 115. Specifically, the processor/control circuitry 110 outputs a feed bowl vibrators voltage signal 127 for supply to the vibratory feeder control circuitry 111, which is configured to transmit a pulsed-mode feed bowl vibrators drive signal 116 to the feed bowl vibrators 115 based upon a feed bowl vibrators voltage signal 127. During operation of the device, the signal 117 from the accelerometer 114 can be used measure vibration amplitude of the feed bowl 113, which is used to provide feedback for automatic control of the vibration amplitude of the feed bowl 113 by the processor/control circuitry 110 via the feed bowl vibrators voltage signal 127 suppled to the vibratory feeder control circuity 111.

Also, as shown in FIG. 3A, the apparatus 100 can also include a communication interface 123 that is communicatively coupled between the processor/control circuitry 110 and an external host controller 124 (which is external to the apparatus 100). The external host controller 124 may be coupled to the communication interface 123 via a communication link 125, which may be a wired (e.g., data communication cable shown in FIG. 3A) or a wireless communication link. The host controller 124 can be configured to communicate instructions and/or data to/from the apparatus 100 via the communication interface 123. The instructions and/or data can control the automatic operation of the apparatus 100, including setting operating parameters (such as the target count, start command, stop command . . . ) of the apparatus 100 and providing status information to enable troubleshooting and testing of the apparatus 100.

The processor/control circuitry 110 also functions as a task manager for organizing and controlling the operating sequence of one or more software code modules resident in the processor/control circuitry 110, and thus for controlling the automated operation of the apparatus.

While the processor/control circuitry 110 shown in the embodiment of FIG. 3A is described above as controlling the automated operation of the apparatus 100 as well as processing the image pixel data for tablet counting and tablet size classification, it will be appreciated that multiple processors and/or controllers may be used to separately perform those functions or those functions may be performed together on multiple processors and/or controller not shown in FIG. 3A.

Furthermore, the processor/control circuitry 110 shown in the embodiment of FIG. 3A can include at least a microprocessor, microcontroller, processor module or subsystem, programmable integrated circuit, programmable gate array, digital signal processor (DSP), or another control or computing device. The processing operations of the processor/control circuitry 110 can be dictated by a sequence of computer-executable instructions and associated data stored in one or more non-transitory computer-readable or machine-readable storage media. The storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the operations of the processor/control circuitry 110 as described herein may be implemented by running one or more functional modules in an information processing apparatus such as general purpose processors or controllers or application specific chips, such as ASICs, FPGAs, PLDs, SOCs, or other appropriate devices. These modules, combinations of these modules, and/or their combination with general hardware are all included within the scope of the disclosure.

In one embodiment, the operating sequence of the apparatus 100 embodies the following. It is assumed that the hopper is adequately filled with a desired tablet type. The external host controller 124 sends an instruction to the communication interface 123 of the apparatus 100, where such instruction include a count command that specifies a certain number of tablets to be counted and dispensed by the apparatus 100. The instruction is received and processed by the processor/control circuitry 110, which controls the operation of the apparatus 100 to count and dispense the specified number of tablets. Since it is possible that the apparatus 100 may dispense too many or too few tablets, the specified amount of tablets will be referred to as a target quantity.

The processor/control circuitry 110 controls the feeder vibrator 108a, which can vibrate the linear feeder 108 to cause tablets in the hopper 106 to flow into the bowl 113. The rate of flow of tablets from the hopper 106 to the feed bowl 113 may be based at least in part on the amplitude of vibration imparted to the linear feeder 108 by the feeder vibrator 108a. The feed bowl 113 is vibrated by the feed bowl vibrators 115 under control of the processor/control circuitry 110 such that the tablets stored in the feed bowl 113 move by centrifugal force, gravity and friction to the spiral guide pathway 113b and then move by centripetal force, gravity and friction along the spiral guide pathway 113b to the exit opening 113a, which leads to the optical system (source/sensor array) 118. Note that the rate of tablets in the singulated flow of tablets that pass through the exit opening 113a of the feed bowl 113 is based at least in part on the amplitude of vibration imparted to the feed bowl 113 by the vibrators 115. The singulated flow of tablets that move through the exit opening 113a pass through the channel 118 of the optical system (light source/sensor array) 118a, which generates image pixel data that is converted into the digital domain and processed by the processor/control circuitry 110 to generate a count of the singulated flow of tablets that pass through the channel 118 as well as determine a size classification for the singulated flow of tablets that pass through the channel 118. Both the tablet count and size classification can be used by the processor/control circuitry 110 to automatically control the amplitude of vibration imparted to the feed bowl 113 by the feed bowl vibrators 115 in order to automatically increase or decrease the rate of tablets in the singulated flow of tablets conveyed from the feed bowl to the optical system for counting and dispensing, and thereby control the accuracy of the tablet counting and dispensing to minimize overcounts in the dispensing operation.

There have been described and illustrated herein certain methods and devices for controlling the flow of discrete objects in a sorter/counter. While particular embodiments have been described, it is not intended that the invention be limited thereto, as it is intended that the invention be as broad in scope as the art will allow and that the specification be read likewise. Thus, while particular dimensions, locations, and configurations of a feed bowl and vibrators have been disclosed, it will be appreciated that other dimensions, locations, and configurations could be utilized. Also, while certain circuits have been described, it will be recognized that other types of circuits could be used with similar results obtained. Moreover, while particular configurations have been disclosed in reference to a microprocessor and certain software for use therewith, it will be appreciated that other types of processors and variations in the disclosed software could be used as well. Furthermore, while the counter with sensor array has been disclosed as having certain configurations, it will be understood that different configurations can achieve the same or similar function as disclosed herein. It will therefore be appreciated by those skilled in the art that yet other modifications could be made to the provided invention without deviating from its spirit and scope as so claimed.

What is claimed is:

1. A vibratory tablet feeder comprising:
   a reservoir for storing a supply of tablets with a pathway that leads to an exit opening for discharging tablets therefrom, wherein vibration of the reservoir moves tablets as a flow of tablets along the pathway to the exit opening; and
   a wiper spaced vertically from the pathway, wherein the wiper has a horizontal segment having a wiping surface that is configured to guide at least one vertically-bunched tablet in the flow of tablets away from the exit opening for return to the reservoir in order to provide singulated flow of tablets at the exit opening;
   wherein a portion of the pathway defines a chamfered edge that is configured to guide at least one horizontally-bunched tablet in the flow of tablets away from the exit opening for return to the reservoir in order to provide singulated flow of tablets at the exit opening.

2. A vibratory tablet feeder according to claim 1, wherein: the wiper is vertically adjustable relative to the pathway.

3. A vibratory tablet feeder according to claim 1, wherein:
   the wiping surface is offset vertically from the pathway at a distance in the range of 1.1 to 1.8 times the size of the tablets stored in the reservoir.

4. A vibratory tablet feeder according to claim 1, wherein:
   the reservoir has an annular side wall, the exit opening is defined by an opening adjacent the side wall, and the pathway is defined by a ramp disposed adjacent a portion of the side wall, where the ramp leads to the exit opening.

5. A vibratory tablet feeder according to claim 4, wherein:
   the wiper extends from the side wall at a position proximate to the exit opening.

6. A vibratory tablet feeder according to claim 5, wherein:
   the wiper has a vertical segment that extends vertically towards the ramp, the vertical segment extending in the pathway and reducing a width of the ramp based on a dimension of the tablets stored in the reservoir.

7. A vibratory tablet feeder according to claim 4, wherein:
   the wiping surface extends substantially parallel to and spaced above the ramp.

8. A vibratory tablet feeder according to claim 4, wherein:
   the wiping surface curves radially inward.

9. A vibratory tablet feeder according to claim 8, wherein:
   the wiping surface has a leading end opposite a trailing end, where radial position of the trailing end is further away from the side wall as compared to radial position of the leading end.

10. A vibratory tablet feeder according to claim 1, further comprising:
    a detachable coupling for coupling the wiper to the reservoir.

11. A vibratory tablet feeder according to claim 10, wherein:
    the detachable coupling includes at least one threaded fastener.

12. An apparatus for counting discrete objects, the apparatus comprising:
    the vibratory tablet feeder according to claim 1; and
    a counter coupled to the exit of the vibratory tablet feeder for counting tablets that are fed from the exit opening.

13. An apparatus according to claim 12, further comprising:
    a vibratory hopper for supplying tablets to the vibratory tablet feeder.

14. An apparatus according to claim 12, further comprising:
    a discharge chute coupled to the counter for dispensing tablets therefrom.

15. A vibratory tablet feeder comprising:
    a reservoir for storing a supply of tablets with a pathway that leads to an exit opening for discharging tablets therefrom, wherein vibration of the reservoir moves tablets as a flow of tablets along the pathway to the exit opening, wherein a portion of the pathway defines a chamfered edge that is configured to guide at least one horizontally-bunched tablet in the flow of tablets away from the exit opening for return to the reservoir in order to provide singulated flow of tablets at the exit opening.

16. A vibratory tablet feeder according to claim 15, wherein:
    the reservoir has an annular side wall, the exit opening is defined by an opening adjacent the side wall, and the pathway is defined by a ramp disposed adjacent a portion of the side wall, where the ramp leads to the exit opening.

17. A vibratory tablet feeder according to claim 16, further comprising:
    a wiper coupled to the annular side wall, the wiper having a tapered horizontal wiper segment configured to control vertical-bunching, and tapered vertical wiper segment configured to control horizontal bunching.

18. An apparatus for counting discrete objects, the apparatus comprising:
    the vibratory tablet feeder according to claim 15; and
    a counter coupled to the exit of the vibratory tablet feeder for counting tablets that are fed from the exit opening.

19. An apparatus according to claim 18, further comprising:
    a vibratory hopper for supplying tablets to the vibratory tablet feeder.

20. An apparatus according to claim 19, further comprising:
    a discharge chute coupled to the counter for dispensing tablets therefrom.

21. A vibratory tablet feeder kit comprising:
- a reservoir for storing a supply of tablets with a pathway that leads to an exit opening for discharging tablets therefrom, wherein vibration of the reservoir moves tablets as a flow of tablets along the pathway to the exit opening; and
- a plurality of wipers each configured for interchangeable coupling to the reservoir, wherein each wiper is sized in relation to the reservoir based on a corresponding size or range of sizes of tablets stored in the reservoir, wherein when each wiper is coupled to the reservoir, each wiper is spaced vertically from the pathway, and wherein each wiper has a wiping surface that is configured to guide at least one vertically-bunched tablet in the flow of tablets away from the exit opening for return to the reservoir in order to provide singulated flow of tablets at the exit opening.

22. A vibratory tablet feeder kit according to claim 21, wherein:
- a portion of the pathway defines a chamfered edge that is configured to guide at least one horizontally-bunched tablet in the flow of tablets away from the exit opening for return to the reservoir in order to provide singulated flow of tablets at the exit opening.

\* \* \* \* \*